United States Patent [19]

Barresi et al.

[11] Patent Number: 4,983,348
[45] Date of Patent: Jan. 8, 1991

[54] IN-MOLD LABELING OF INJECTION BLOW MOLDED PRODUCTS

[75] Inventors: Lawrence J. Barresi, Mays Landing; Charles H. L. Reilly, Williamstown, both of N.J.

[73] Assignee: Wheaton Industries, Millville, N.J.

[21] Appl. No.: 273,695

[22] Filed: Nov. 21, 1988

Related U.S. Application Data

[63] Continuation of Ser. No. 924,691, Oct. 29, 1986, abandoned.

[51] Int. Cl.[5] .............. B29C 49/08; B29C 49/24; B29C 49/36
[52] U.S. Cl. ..................... 264/509; 264/538; 425/126.1; 425/503
[58] Field of Search .............. 264/509, 538; 425/533, 425/503, 504, 126.1

[56] References Cited

U.S. PATENT DOCUMENTS

| 3,577,291 | 1/1969 | Uchida | 264/538 |
| 4,323,411 | 4/1982 | Uhlig | 156/245 |
| 4,418,906 | 12/1983 | Scott | 271/99 |
| 4,549,863 | 10/1985 | Bourgeois | 425/126.1 |
| 4,601,926 | 7/1986 | Jabarin et al. | 428/35 |

Primary Examiner—Jan H. Silbaugh
Assistant Examiner—Catherine Timm
Attorney, Agent, or Firm—Ratner & Prestia

[57] ABSTRACT

An apparatus for inserting labels into the blow mold cavity of an injection-blow molding machine, which includes a carriage, a label transfer mechanism on the carriage which is made up of a label holder on a curvilinear translator mechanism, and a mechanism for moving the carriage reciprocally. Also, a method for labeling containers, formed in an injection blow molding machine in which the blow mold opens before the injection mold and a label is inserted into the blow mold cavity during the resulting hiatus before parison transfer.

10 Claims, 9 Drawing Sheets

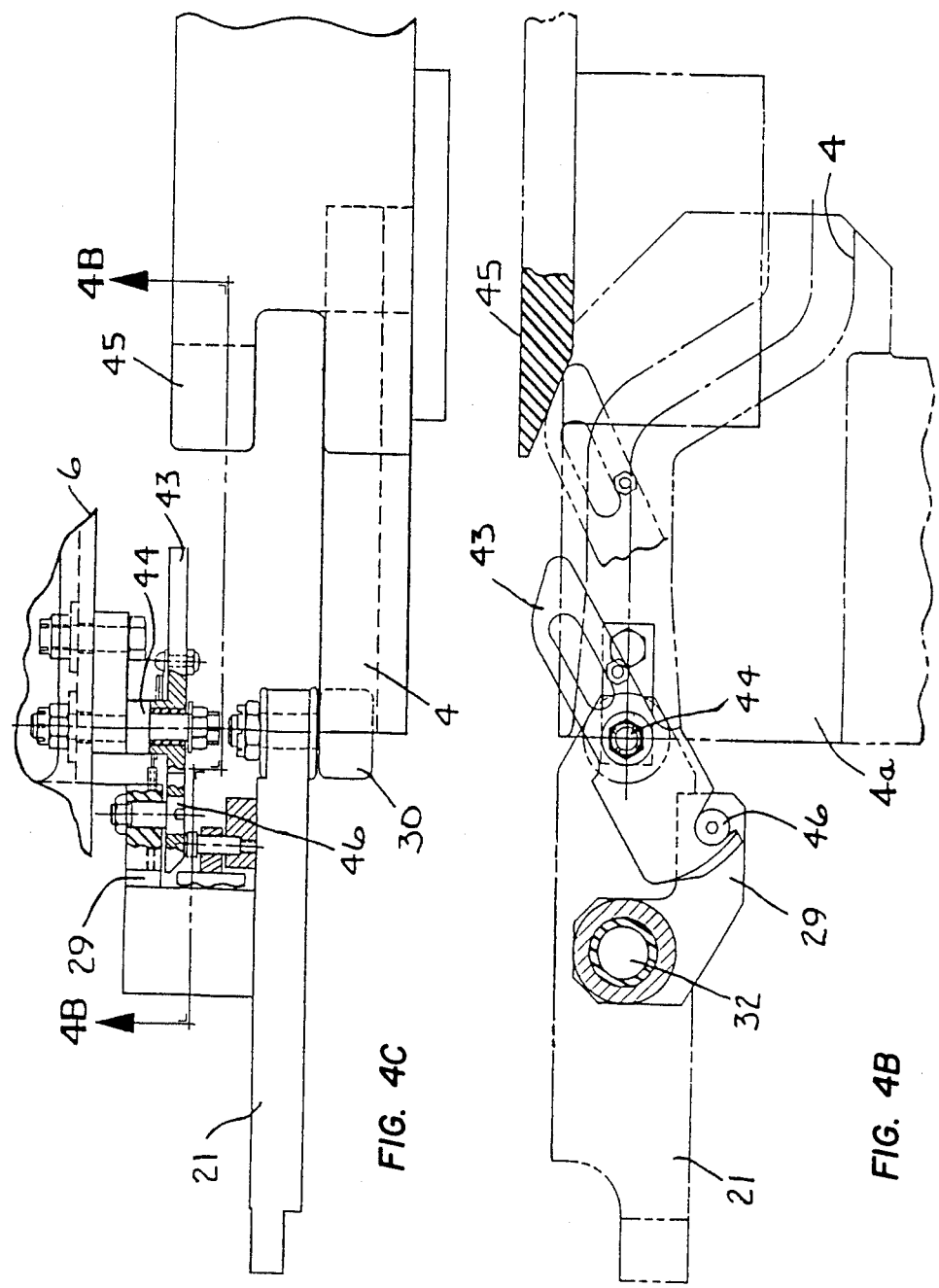

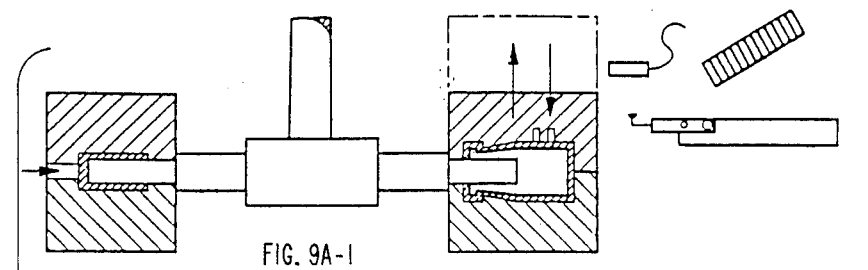
FIG. 9A-1
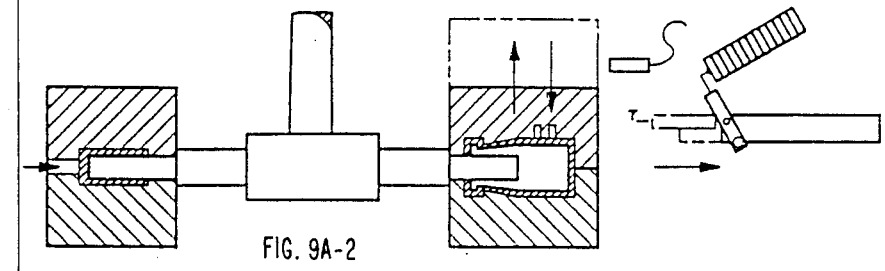
FIG. 9A-2
FIG. 9A
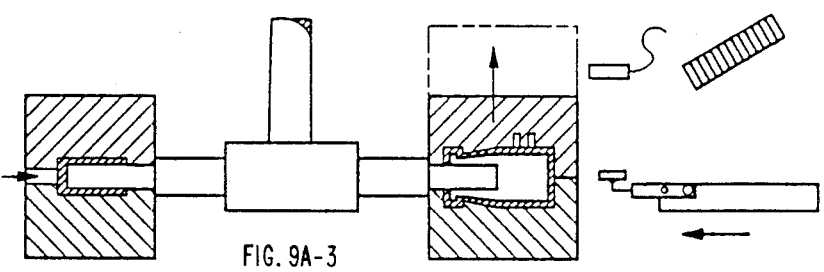
FIG. 9A-3
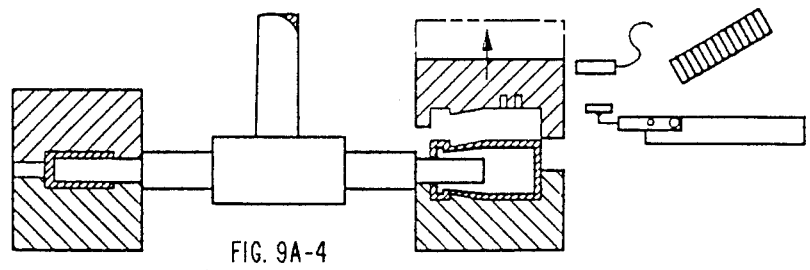
FIG. 9A-4

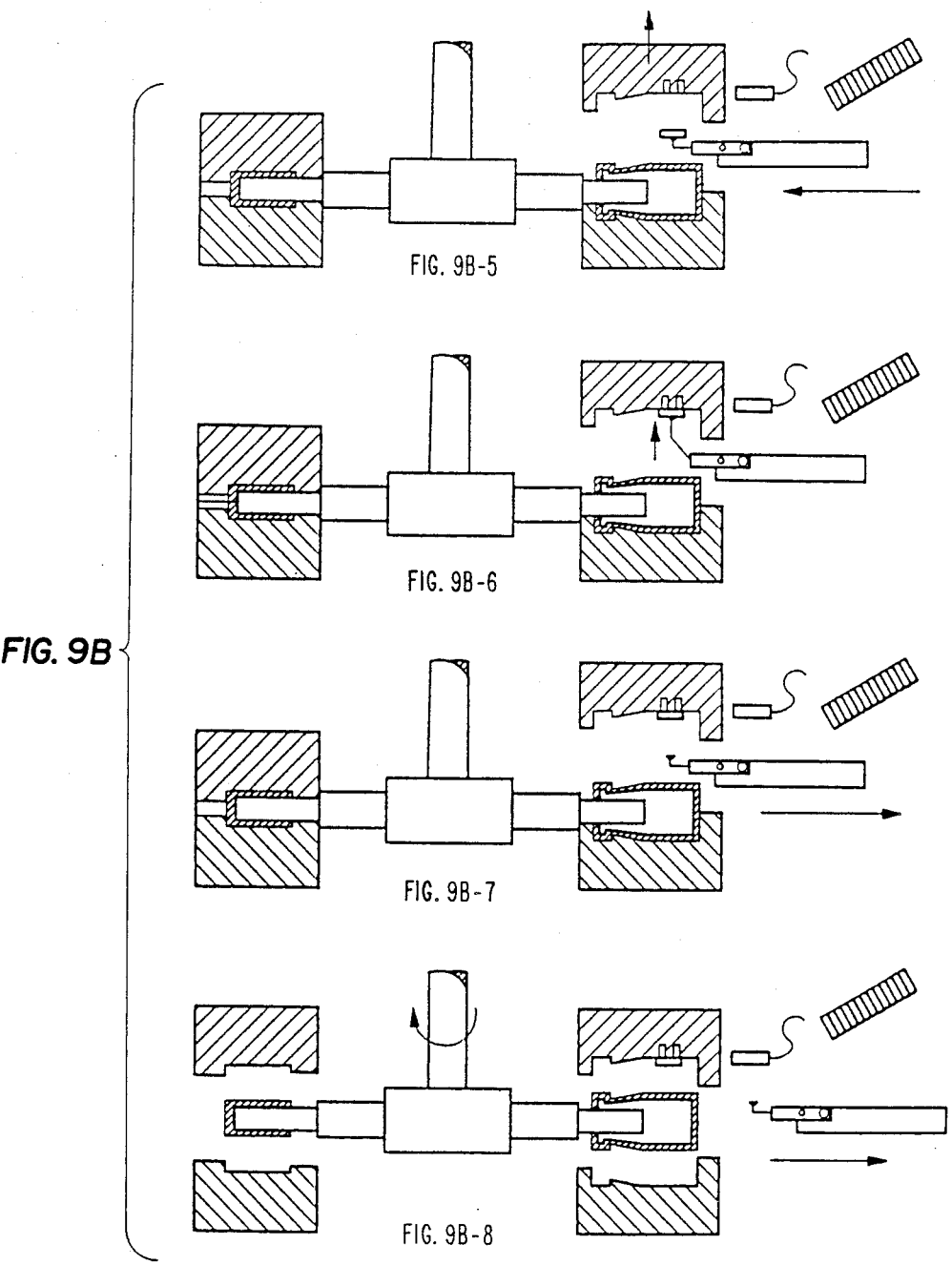

IN-MOLD LABELING OF INJECTION BLOW MOLDED PRODUCTS

This application is a continuation of application Ser. No. 06/924,691, filed Oct. 29, 1986, now abandoned.

TECHNICAL FIELD

This invention relates to the labeling of plastic containers formed in an injection-blow molding process. It is more particularly directed to a method for labeling such containers in the blow mold without interrupting the overall process. The invention also includes an apparatus for practicing this method.

BACKGROUND OF THE INVENTION

Machines and methods for labeling plastic containers by placing a label into a blow mold and then blow-forming the container are known. For example, U S. Pat. Nos. 4,355,967, 4,359,314 and 4,479,644 show machines which insert labels between open halves of blow molds which are mounted on the periphery of a wheel. After the labels have been inserted, preforms (i.e. tubes of hot extruded plastic) are introduced into the cavity. The molds are then closed and the container blown. The labels are bonded to the container, typically by means of a heat-activated adhesive on the back of the label.

U.S. Pat. No. 4,479,771 shows a machine whose blow molds are stationary, but which works in much the same way.

A machine similar to that shown in U.S. Pat. No. 4,479,771 is described in U.S. Pat. No. 3,292,209. The preforms in the '209 patent are said to be injection molded, however.

One known type of injection blow molding machine is that in which split parison and blow molds open along a common parting plane. Work pieces are first injection molded, then blown and removed at successive work stations. Transfer between work stations is accomplished by a turret, which moves in concert with the movable mold halves and rotates about an axis, about which the work stations are radially disposed. The turret has a number of sides (normally three or four) which corresponds to the number of work stations. Core rods or mandrels radially project from each of the turret sides toward the respectively facing work stations.

Such machines are widely used because of their efficiency and dependability, but heretofore have not been thought suitable for in-mold labeling because in all known machines of this type, the parison molds and blow molds open simultaneously just before the transfer stage. Thus the machine's cycle would have to be interrupted briefly while the label is inserted into the blow mold cavity. This is undesirable because it would slow production and because a parison normally should be blown as soon after its transfer as possible for consistent container quality.

SUMMARY OF THE INVENTION

It has now been found that, in machines of the type just referred to (i.e. with a split injection mold which conventionally opens and closes in concert with blow mold opening and closing and the up and down movement of the turret), the blow mold can be opened before the parison mold without an significant adverse consequences. This permits the label to be inserted into the blow mold during the resulting hiatus without interrupting the cycle of the machine.

The method of the invention, therefore, consists of the following steps:

(1) initiating the injection molding and blow molding stages simultaneously;

(2) opening the blow mold before the end of the injection molding stage;

(3) inserting a label into the open blow mold cavity and securing it to one of the halves of the blow mold;

(4) transfer (blown container is moved to the ejection stage and new parison is moved to the blow mold stage); and (5) blowing the parison.

In general the apparatus of the invention comprises a carriage, a label transfer mechanism on the carriage which consists of a label-holding means on a curvilinear translator mechanism, and means for moving the carriage reciprocally, all mechanically connected so that the label-holding means is precisely positioned at the limits of carriage movement to pick up a label from a magazine and, at a precisely timed interval in the injection blow mold machine operation, to place a label accurately within the movable blow mold half.

DESCRIPTION OF THE DRAWINGS

FIGS. 4A and 4B are also sectional, elevational, detail views of the same apparatus shown in FIGS. 2 and 3, but in its rearward label pick-up position, and showing its pivotal movement in removing a label from the label magazine.

FIG. 4C is a plan view of the same apparatus, in the same position, shown in FIG. 4B.

FIGS. 9A and 9B together include a series of sequential, elevational, schematic views of the apparatus of the invention together with inter-related parts of the injection blow molding machine, taken in the folded plan 9—9 of FIG. 7.

DETAILED DESCRIPTION OF THE INVENTION

Figure 1:
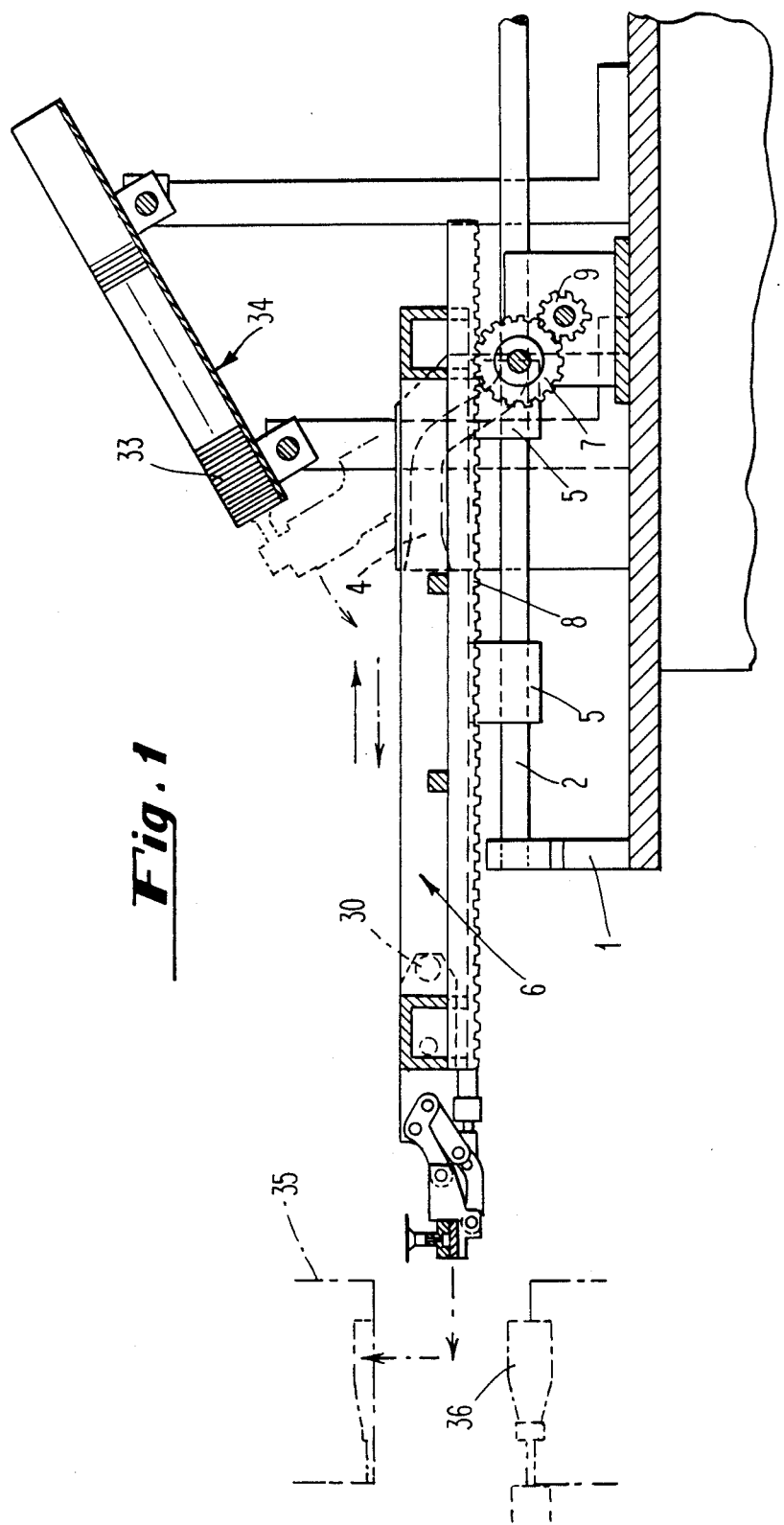
FIG. 1 is a sectional, elevational view of one side of the label inserting apparatus of the invention in plane 1—1 of FIG. 6.
Figure 6:
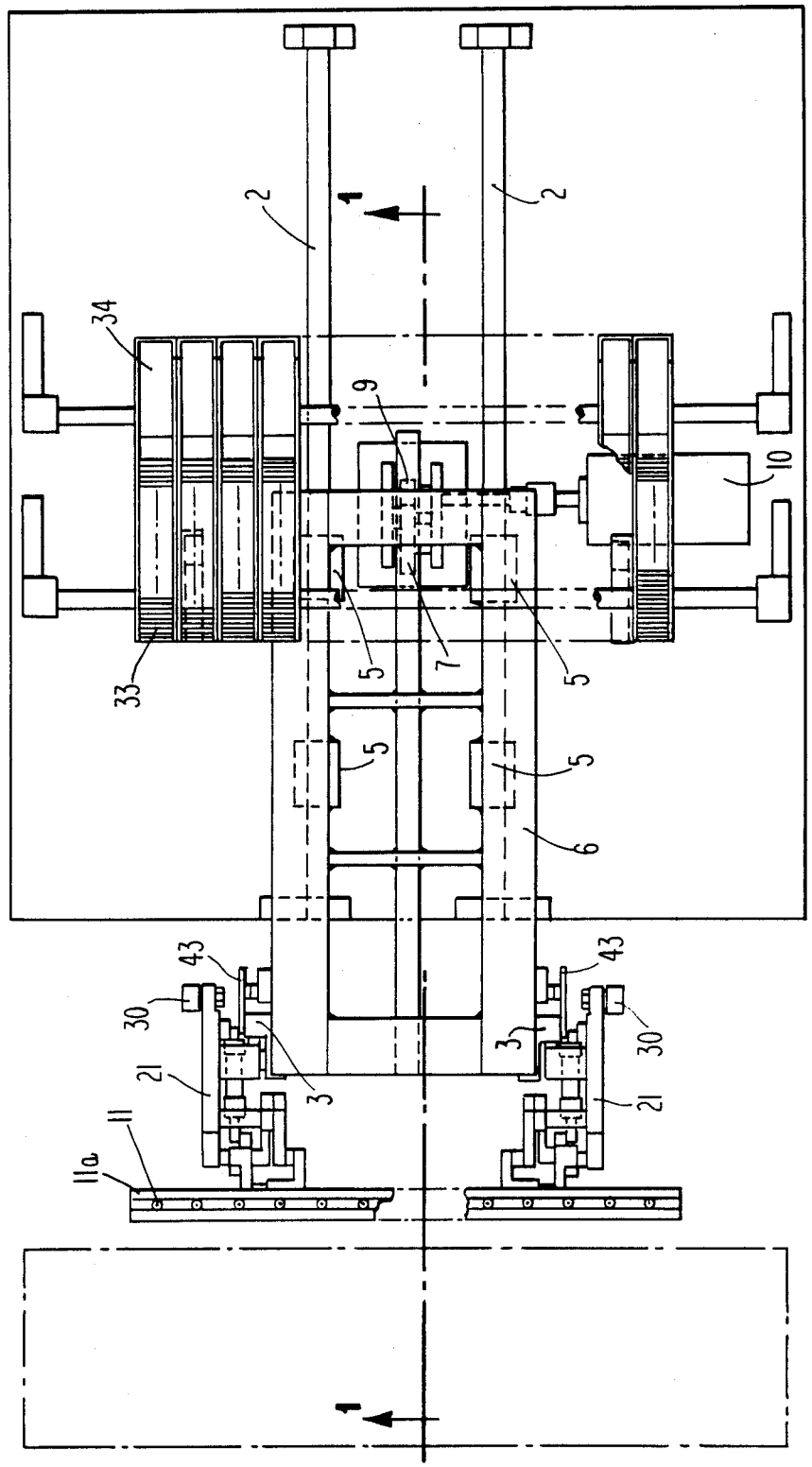
FIG. 6 is a plan view of the over-all label, label storage, label pick-up and transfer mechanism, with a plurality of label holders situated to mate with the multiple cavities of an injection-blow molding machine.

As seen in FIGS. 1 and 6, the in-mold labeller transfer apparatus of this invention comprises a frame 1, on which are mounted guide rods 2. Slidably mounted on guide rods 2 by sleeves 5 is carriage 6, a rectangular frame moved reciprocally by pinion 7 engaging rack 8 and driven by gear 9 and motor 10 (see FIG. 6).

Figure 2:
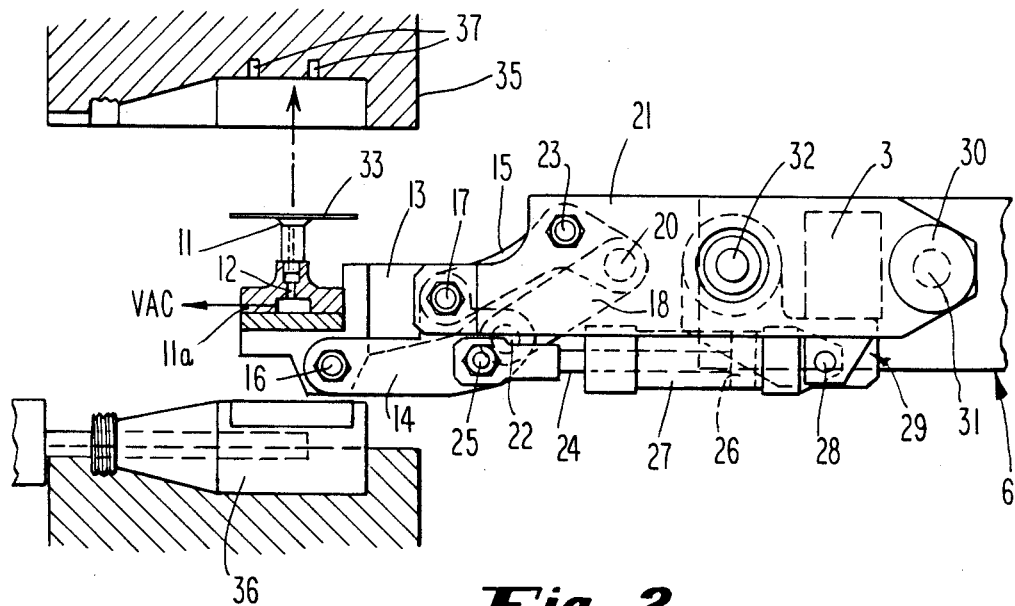
FIGS. 2 and 3 are sectional, elevational, detail views of the apparatus shown in FIG. 1, FIG. 3 showing the vertical movement of a label holder in inserting a label into the blow mold cavity. In both FIGS. 2 and 3, the label transfer mechanism carriage is in the forward label insertion position.
Figure 3:
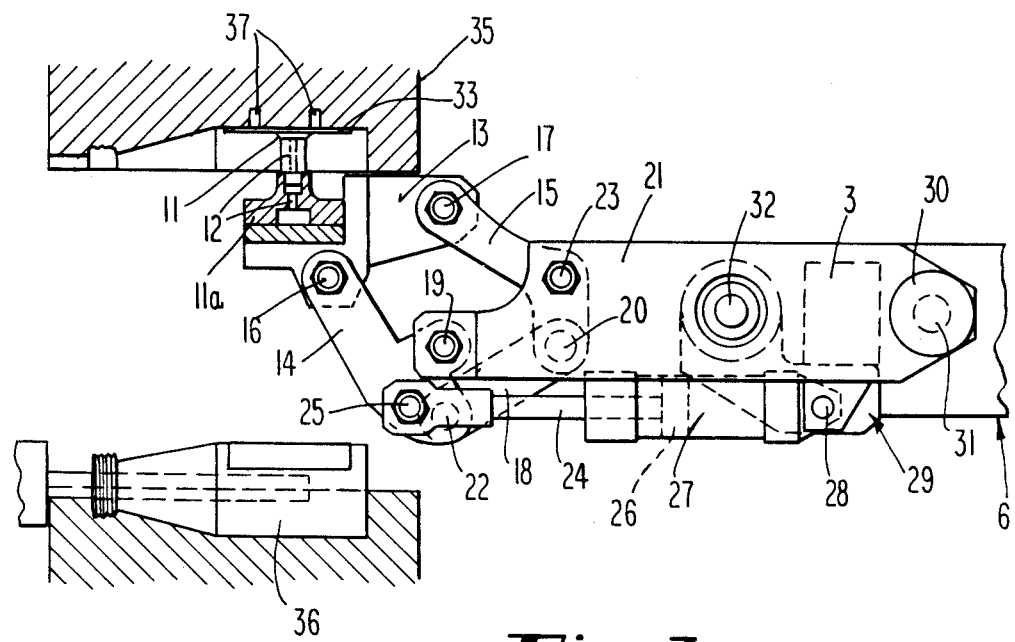

As shown in FIGS. 2, 3 and 6, at one end (the forward end) of carriage 6 is mounted a label transfer mechanism comprising a label holder, more specifically at least one (the number corresponding to the number of cavities in a mating blow mold) vacuum cup 11, each having an orifice 12 at its center, mounted on a label holder bar 11a. Label holder bar 11a is in turn mounted on a curvilinear motion translator mechanism comprised of linking member 13 pivotally connected to arms 14 and 15 by pins 16 and 17, connecting arm 18 pivotally connected to arms 14 and 15 by pins 20 and 22, and support member 21 pivotally connected to arms 14 and 15 by pins 19 and 23. The label transfer mechanism also includes a linear actuator consisting of rod 24 pivotally attached to arm 14 by pin 25 and piston 26 within cylinder 27 attached to support member 21 by pin 28. Cam follower 30 is rotatably mounted on support member 21 by pin 31. The label transfer mechanism is pivotally mounted on carriage 6 by pin 32.

Vacuum cups 11 and magazines 34 are ordinarily engaged to work cooperatively with a multiple cavity injection blow molding machine, as shown in FIG. 6.

As shown in FIGS. 1 and 6, mounted at the other end of the base is label magazine 34 containing labels 33.

In order for label holders 11 to pick up a label 33 from label magazine 34, the label translator mechanism also includes cam followers 30 mounted on support member 21. Curvilinear motion of followers 30 is transmitted through a shaft at the opposite end of support member 21 to arms 14, in turn supporting label holder bar 11a so that the vertical component of the curvilinear motion of followers 30 is translated into a corresponding (but opposite in direction) vertical movement of label holder bar 11a.

Figure 4A:
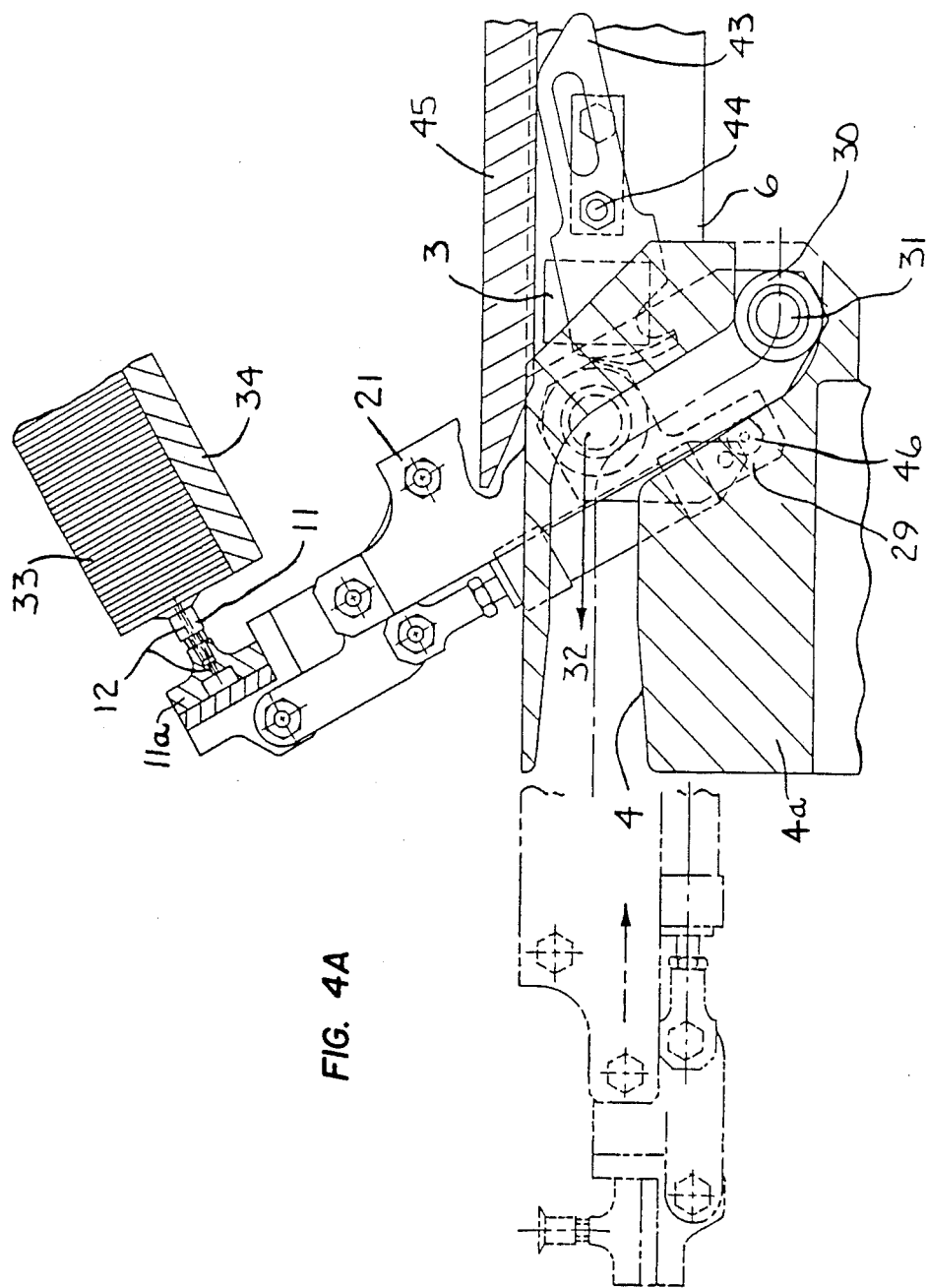

For a better understanding of this movement, reference may be made to FIGS. 4A, 4B and 4C. In FIGS. 4B and 4C, the carriage of the label transfer mechanism is shown in a position approaching the label pick-up position, that is approaching but not at its rearmost terminal position. As particularly seen in FIGS. 4B and 4C, a latching member 43, pivotally connected on shaft 44 associated with carriage 6 engages a pin 46 on a connector arm 29 secured to support member 21 at shaft 32.

Upon further rearward movement of the label translator mechanism, latching member 43 engages the inclined plane of a mating horizontal member 45 associated with frame 1 just below label magazine 34. That engagement causes a pivotal movement of latching member 43, and thus unlatching of the latching member 43 from pin 46 to permit pivotal movement of support member 21 relative to frame 6. That pivotal movement in turn is produced by engagement of cam followers 30 in a track 4 milled in a further stationary member 4a suspended below horizontal member 45 and extending just forward thereof to provide an entry channel from cam followers 30. The rearward movement of the carriage of the label translator mechanism to its rearmost terminal position, as shown in FIG. 4A, results in a generally downward curvilinear motion of cam followers 30 and a corresponding upward pivotal motion of support members 21, arms 14 and label holder bar 11a, in turn bringing label holders 11 and particularly the suction cups thereof into engagement with the bottommost label of label supply 33 in lable magazine 34.

Upon forward movement of the label translator carriage, this movement is reversed.

Operation of the apparatus can be best understood by referring to FIG. 1. In FIG. 1, carriage 6 is shown in its "home" position. From there it is driven to its right extremity (i.e. rearmost or label-pick terminal position) by the action of pinion 7, gear 9 and motor 10 on rack 8. As it approaches that position, latch member 43 engages cam plate 45 unlatching member 43 from latch pin 46. Cam followers 30 then engage cam track 4 and follows its downwardly arcuate path. As shown in FIGS. 1 and 4A, this urges support member 21 into an upwardly arcuate path from the uncammed position shown in phantom as it pivots on pin 32. At the end of this path, vacuum cup 11 engages a label 33 in magazine 34. A vacuum is then drawn through orifice 12, thus holding the label in place on the cup.

Carriage 6 is then moved in the other direction. This urges support member 21 into a downwardly arcuate path by a reverse action until it is stopped by stop arm 29 engaging stop block 3. When the carriage reaches its home position (as shown in FIG. 1), it pauses while the movable half 35 of the blow mold opens (to the mold position shown in FIG. 1), with blown container 36 bearing a label from the action of the preceding cycle resting in the stationary half of the blow mold.

When the blow mold is sufficiently open, the carriage is moved left to the position shown in FIG. 2, with the vacuum cup and label directly below the position on the open half of the blow mold in which the label is to be placed. As shown in FIG. 3, when the carriage reaches this position, pressure (hydraulic or pneumatic) is applied against the right side of piston 26, moving rod 24 to the left, which actuates the curvilinear translator mechanism including arms 14 and 15 and moves the label holder bar 11a and labels retained thereon upwardly into engagement with the open half of the blow mold. The curvilinear translator provides this vertical motion of the cup with no horizontal motion by pivoting arm 14 about pin 22, while arm 15 and connecting arm 18 hold linking member 13 in a perfectly horizontal plane through its upward track.

When label 33 is in its proper position and in engagement with the open half of the blow mold, the vacuum in orifice 12 is released and a slight puff of positive pressure air is introduced to ensure separation of the labels from label holders 12. At the same time, a vacuum is drawn in orifice 37 in each cavity of the upper or movable blow mold half, thus holding the labels in position. Labels thus placed remain until another container is formed, at which time the vacuum in orifice 37 is released. The label is bonded to the container by the action of heat from the container activating adhesive on the back surface of the label.

The label transfer mechanism then retracts to the position shown in FIG. 2 by pressure being applied to the opposite side of piston 26. The carriage is then withdrawn from the blow mold cavity to its home position, where it pauses until another cycle begins.

Figure 7:
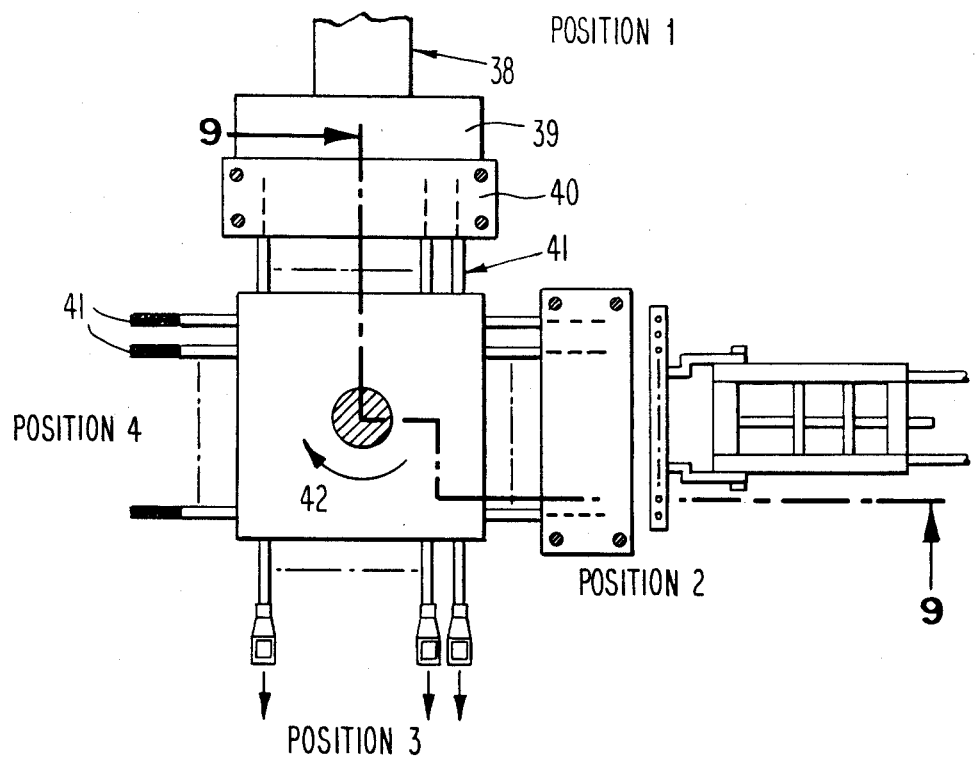
FIG. 7 is a schematic plan view of the apparatus of the invention showing its spatial relationship to the turret of an injection-blow molding machine.
Figure 5:
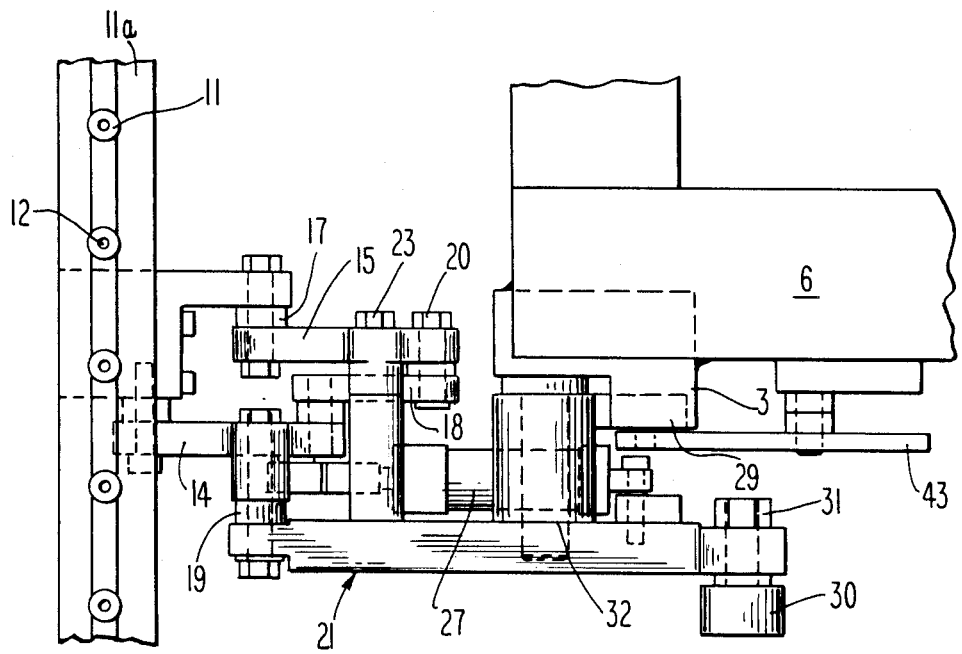
FIG. 5 is a plan view of one side of the label transfer mechanism in its forward, label-insertion position.

The apparatus of the invention is used in combination with a multi-station injection-blow molding machine, the turret, core rods plastifier and molds of which are schematically illustrated in FIG. 7.

In operation, at the machine's first (or injection molding) work station (position 1), plastic raw material is fed from plastifier 38 through a manifold 39 that delivers material into a multi-cavity parison mold 40 where parisons are injection-molded on each of core rods 41. When the parisons are ready to be transferred, the parison mold opens, turret 42 is raised and indexed 90°, which carries the parisons on the core rods clockwise to the machine's second (blow molding) work station (position 2), at which labels have already been inserted into the blow mold cavity when the blow mold was opened earlier.

This turret motion also raises the label-bearing containers from the preceding cycle and moves them on the core rods to the third or ejection station (position 3), where they are ejected from the core rods.

In the apparatus as shown and described above, this motion also moves the empty core rods from the preceding cycle to position 4, where they are cooled until brought into position 1 for the next cycle.

The apparatus and method of this invention should work equally well, however, on a three station machine, in which case the empty core rods, upon indexing, would simply move back to the injection station.

Figure 8:
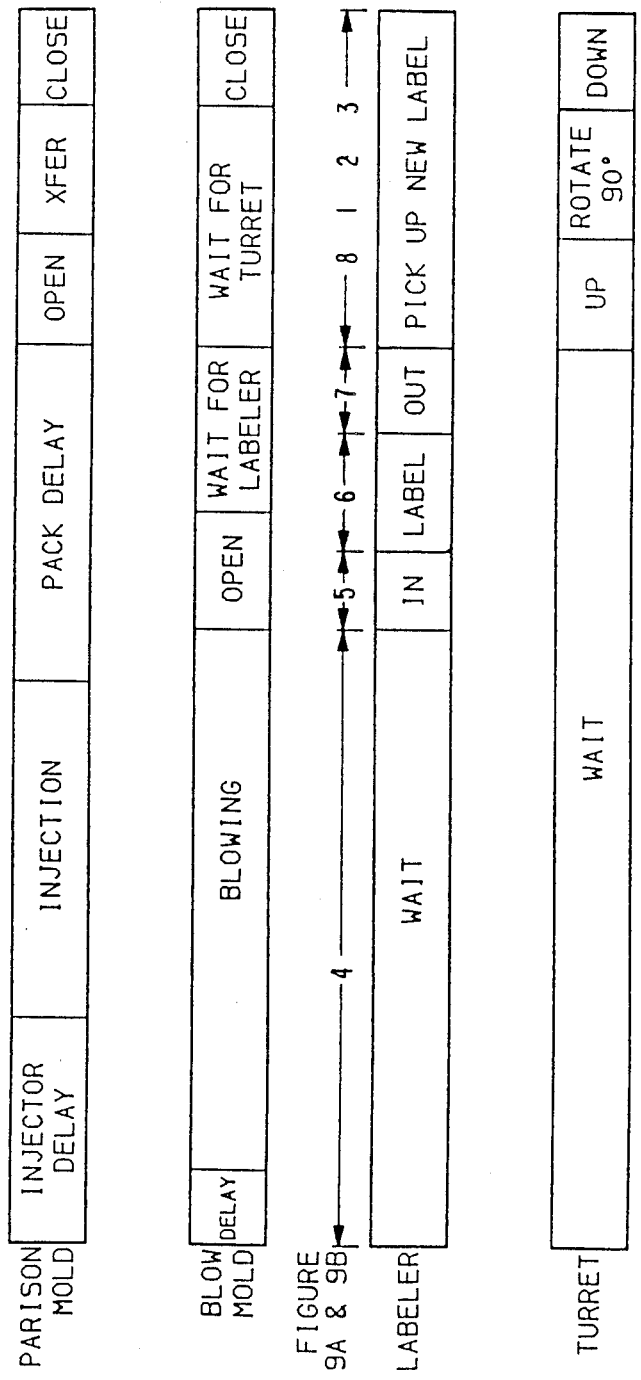
FIG. 8 is a cycle sequence chart showing the sequence of steps in the method of the invention.

For the benefits of the method to be obtained, it is necessary that the steps just described be performed in proper sequence as shown in FIG. 8. This can be accomplished by conventional electromechanical control means or by a computer or microprocessor. In any event, the duration of the various phases in this sequence will vary somewhat as determined by the nature of the plastic being used and the size and shape of the container being blown.

The movement of functional parts of the apparatus, to accomplish the cycle sequence charted in FIG. 8, is shown schematically in FIGS. 9A and 9B.

The various stages of this function sequence are:

A. The parison mold and blow mold are closed and parisons and containers are being molded. The empty label transfer mechanism is at the home position awaiting a labeller start signal.

B. The in-mold labeler is started. The label transfer mechanism leaves the home position and moves to the right to pickup a supply of labels from the label magazine station.

C. The label transfer mechanism returns to the home position with a supply of labels and waits for the blow mold to open.

D. The blow mold starts to open and a sensor detects a safe opening passage for the label transfer mechanism to enter. The injection mold remains closed. The turret is idle.

E. The label transfer mechanism is in position to deposit the labels in the open blow mold cavities. A blown container rests in one-half of the blow mold cavity. The parison mold remains closed and the turret is idle.

F. The curvilinear translator extends and deposits the labels in the open blow mold cavity, where the labels are held secure to the mold by vacuum.

G. The curvilinear translator retracts to the lower position for safe passage out of the blow mold cavity path.

H. The label transfer mechanism returns to the home position, the blow mold remains open, the parison mold has opened and the turret has lifted preparatory to indexing 90 degrees.

Thereafter the cycle repeats itself. The turret indexes 90 degrees. The molds close. The label carriage moves to the right to pick up a new supply of labels, etc.

The apparatus of this invention may also provide for simultaneous in-mold labelling on two sides of the molded container. In this embodiment, both halves of the blow mold would move away from the part line, leaving the previously blown product on the core rod. Then two label insertion mechanisms would be actuated to simultaneously place a label in each of the blow mold halves. The process would otherwise be identical to that described above.

While this invention has been described with respect to specific embodiment thereof, it is not limited thereto and the appended claims are intended to be construed to include within their scope all variance and modifications and embodiments of the invention as may be devised by those skilled in the art, which are within the true spirit and scope of the invention as disclosed and claimed.

We claim:

1. In a method for injection blow molding hollow thermoplastic articles, in an injection blow molding machine having split parison and blow molds which open along a common parting plane and which each comprises moveable and stationary mold halves which moveable mold halves are reciprocally moveable, in parallel, between a first, closed, position and a second, open, position, wherein work pieces are first injection molded, then blown and removed at successive work stations, and wherein transfer of the work pieces between work stations is accomplished by a turret which moves from a lower, work piece operating turret position, to a higher, rotating position, in concert with, and parallel to, said moveable mold halves and wherein said turret is in said lower, work piece operating turret position when said work pieces are in a lower, work piece operating work piece position and when said work pieces are in said blow and parison molds, which turret rotates about an axis and wherein core rods project radially from turret sides toward work stations facing said core rods, said method including the sequential steps of:

injection molding work pieces at the injection molding work station, and blow molding work pieces at the blow molding work station;

opening said blow and parison molds by moving said moveable blow and parison mold halves to their respective open positions;

removing work pieces from said work piece operating work piece position by raising said turret;

rotating said turret and work pieces thereon; and closing said blow and injection molds;

the improvement comprising sequentially:

opening said blow mold by moving said moveable blow mold half to said open position before opening said injection mold;

placing a label in said moveable blow mold half while previously blown and labeled work pieces remain in said lower, work piece operating work piece position and said turret remains in said lower, work piece operating turret position;

releasably securing said label in said moveable blow mold half;

opening said parison mold by moving said moveable parison mold half to said open position, while simultaneously moving said turret from said lower, work piece operating turret position to said rotating position and removing previously blown and labeled work pieces from said lower, work piece operating work piece position;

moving said blow molded work pieces to said successive work station by rotating said turret; and moving said turret from said rotating position to said lower work piece operating turret position and closing said blow and injection molds;

whereby said machine is adapted to permit insertion of said labels into said blow mold before previously blown and labeled work pieces are moved from said lower, work piece operating work piece position without increasing overall machine cycle time.

2. In an injection blow molding machine having split parison and blow molds which open along a common parting plane and which each comprise moveable and stationary mold halves, which moveable halves are reciprocally moveable between a first, closed, position and a second, open, position, wherein work pieces are first injection molded, then blown and removed at successive work stations, and wherein transfer of the work pieces between work stations is accomplished by a turret which holds said work pieces and which moves from a lower, work piece operating turret position, to a higher, rotating position, in concert with, and parallel to the opening and closing movement of said moveable mold halves, wherein said turret is in said lower, work piece operating turret position when said work pieces are in a lower, work piece operating work piece position and when said work pieces are in said blow and parison molds, which turret rotates about an axis and includes core rods projecting radially from turret sides toward work stations facing said core rods, said work pieces being carried to successive work stations on said core rods, said machine including means for opening said blow and parison molds by moving said moveable mold halves to their open position, the improvement comprising:
 means for placing a label in said moveable blow mold half, when said blow mold half is in said open position but said moveable parison mold half is in said closed position, and when said turret is in said lower, work piece operating turret position and previously blown and labeled work pieces are in said lower, work piece operating work piece position;
 means for releasably securing said label in said moveable blow mold half;
 said means for opening said parison mold being independently operable from said blow mold opening means; and
 timing means for sequentially activating said blow mold opening means, said label placing means, said label securing means and said parison mold opening means;
 wherein said machine is adapted to permit insertion of said labels into said blow mold before said turret is moved from said lower, work piece operating turret position and said previously blown and labeled work pieces are moved from said lower, work piece operating work piece position, without increasing overall machine cycle time.

3. The apparatus of claim 2 wherein said means for placing a label in said moveable blow mold half comprises:
 a label magazine for presenting said releasably holding a plurality of labels;
 a carriage;
 means for moving said carriage reciprocally between two positions, namely:
  (1) a label magazine position, near and in a fixed position relative to said moveable blow mold half; and
  (2) an in-mold label position, near and in a fixed position relative to said moveable blow mold half; and
 a label transfer mechanism on said carriage, including means for taking a label from said magazine and holding it for placement in said moveable blow mold half.

4. The apparatus of claim 3, wherein said transfer mechanism includes a selectively actuable linkage for causing said mechanism to engage said magazine and said moveable blow mold half at the two positions of said carriage.

5. The apparatus of claim 4, wherein said selectively actuable linkage is a curvilinear translator mechanism.

6. The apparatus of claim 4, wherein said two carriage positions are horizontally displaced from one another, said mold opening movement is vertical, and said selectively actuable linkage holds said means for holding said label in a fixed horizontal orientation during actuation movement of said linkage.

7. The apparatus of claim 3, wherein said carriage is slidably mounted on a fixed base, said base having a stop member, said stop member having a cam track therein, said label transfer mechanism having a cam adapted to engage said cam track as said carriage approaches said label magazine carriage position, said engagement causing pivotal movement of said means for holding said label.

8. The apparatus of claim 3, further including a plurality of mating magazines and label holding means in linear disposition perpendicular to the direction of movement of said carriage.

9. The apparatus of claim 2, wherein said means for releasably securing said label comprises vacuum means associated with said moveable blow mold half.

10. The apparatus of claim 9, wherein said vacuum means comprises orifices in said moveable blow mold half and means for creating a negative gauge pressure through said orifices to retain a label on said moveable blow mold half and means for providing a positive gauge pressure through said orifices to assist in the removal of labeled, molded work pieces from said lower, work piece operating work piece position.

* * * * *

UNITED STATES PATENT AND TRADEMARK OFFICE
CERTIFICATE OF CORRECTION

PATENT NO. : 4,983,348

DATED : January 8, 1991

INVENTOR(S) : Lawrence J. Barresi and Charles H. L. Reilly

It is certified that error appears in the above—identified patent and that said Letters Patent is hereby corrected as shown below:

Column 8, line 4 after "presenting" delete the word "said" and substitute therefor --and--.

Column 8, lines 10-11 delete the words "moveable blow mold half" and substitute therefor --label magazine--.

Signed and Sealed this

Thirty-first Day of March, 1992

Attest:

HARRY F. MANBECK, JR.

*Attesting Officer*  *Commissioner of Patents and Trademarks*